United States Patent [19]

Tess

[11] 3,973,694
[45] Aug. 10, 1976

[54] PRESSURE-COOKER
[75] Inventor: Peter Tess, Hohengang, Germany
[73] Assignee: Oberschwabische Metallwarenfabrik GmbH & Co. KG, Riedlingen (Wurttemberg), Germany
[22] Filed: Apr. 16, 1975
[21] Appl. No.: 568,737

[52] U.S. Cl. .............................. 220/206; 220/303; 220/316
[51] Int. Cl.² .................... B65D 51/16; B65D 45/00
[58] Field of Search .......... 220/316, 303, 208, 206, 220/203, 202, 3; 292/254

[56] References Cited
UNITED STATES PATENTS

| | | | |
|---|---|---|---|
| 2,483,297 | 9/1949 | Naylor | 220/203 |
| 2,566,008 | 8/1951 | Westby | 220/203 |
| 2,591,767 | 4/1952 | Andres | 220/203 |
| 2,614,721 | 10/1952 | Wyman | 220/303 X |
| 3,765,563 | 10/1973 | Kraft et al. | 220/316 |

Primary Examiner—William Price
Assistant Examiner—Steven M. Pollard
Attorney, Agent, or Firm—Watson, Cole, Grindle & Watson

[57] ABSTRACT

The specification describes a pressure-cooker with pot and lid parts which can be turned in relation to each other and can be connected with each other by means of a bayonet joint or the like. Pot lid handles can be locked with each other and a pressure limiting valve which is adapted to be loaded by a spring and is arranged on the lid. The loading spring of the pressure limiting valve is preloaded in accordance with the locking together of the pot and lid handles.

27 Claims, 25 Drawing Figures

PRESSURE-COOKER

The invention relates to a pressure-cooker with pot and lid parts which can be turned in relation to each other and can be connected with each other by means of a bayonet joint or the like, with pot and, respectively, lid handles which can be locked with each other and a pressure limiting valve which is adapted to be loaded by a spring and is arranged on the lid.

In the case of previously proposed pressure-cookers of this type the pressure limiting valve is arranged separately from the locking device on the pot lid. Furthermore, a proposal has been made to arrange an excess pressure valve on the pot lid, which on a certain maximum internal pressure being exceeded in the pot automatically opens and allows the escape of the excess pressure from the pot. Furthermore, a proposal has been made to arrange a pressure indicating device on the lid, whose indicating pin or pointer comes further and further out of an opening of the lid as the internal pressure increases and accordingly indicates the amount of internal pressure. The locking device is generally incorporated in one or both handles.

In the case of previously proposed pressure-cookers it may occur that the pot, that is to say the cooker is opened before the excess pressure or gauge pressure has escaped from the cooker or that the loading spring of the pressure loading valve is cocked and accordingly the pressure of steam in the cooker is increased before the pot and lid handles are locked together in the proper manner. Furthermore, it may occur that a substantial part of the safety device is omitted by mistake or is incorrectly fitted in the case of fitting or on putting together the cooker, for example after cleaning the device which has been taken apart for this purpose.

In this case the safety system may become ineffective, the cooker can be subjected to an excessively high pressure or on opening the cooker hot steam or cooked material may be forced out of the cooker under pressure and scald the cook.

A principal purpose of the invention is that of creating a pressure-cooker which offers enhanced safety as regards the occurrence of such dangerous situations. A further aim of the invention is to prevent the emergence of steam or cooked material from the pressure indicating means. A still further aim of the invention is to make the use of the pressure-cooker simple and foolproof as regards errors in operating it, and furthermore there is the intention of facilitating assembly, taking it apart and cleaning.

The invention resides substantially in that the loading spring of the pressure limiting valve can be preloaded in accordance with the locking together of the pot and lid handles. Preferably the invention is so put into practice that the loading spring of the pressure limiting valve can only be preloaded or cocked when the pot and lid handles are locked. In accordance with a convenient construction of the invention on one of the handles or on both of them, preferably though on the lid handle a moving setting part is journalled, which in accordance with the invention can be a combination of a spring preloading or cocking part and a locking part, for example a pivoting segment which is journalled in the one handle and can be turned. This segment has a spring cocking part, coupled with the loading spring of the pressure indicating valve, and a locking bolt part, which on turning of the pivoting segment fits into a bolt receiving recess in the other handle. In accordance with a particularly advantageous embodiment of the invention the moving setting part does not need to be constructed simultaneously as a locking part and instead a separate locking part can be provided, which so cooperates with the setting part that a cocking of the loading spring of the pressure limiting valve only becomes possible when the locking part has come to lie in its locking setting or position.

Owing to the invention it is possible to ensure that no high steam pressure can develop in the cooker before the pot and lid handles are so locked together that the bayonet closure cannot be undone by twisting back the lid on the pot. A cocking in error of the loading spring of the pressure limiting valve is no longer possible. Accidents owing to incorrect operation or faulty assembly of the pressure-cooker can no longer occur.

In this connection it is possible in accordance with the invention for the device for cocking the loading spring to have an actuation stop, which with the help of a presetting part is overriden during the locking operation. This presetting part can advantageously also be formed by the seperarate locking part. In this manner it is possible to increase security as regards premature cocking of the loading spring of the pressure limiting valve. Furthermore, with the help of the presetting part or the locking part it is possible to ensure that the cocking of the loading spring must be overriden by a resetting of the setting part before the locking of the pot and lid handles is undone.

As a loading spring, in accordance with a particularly advantageous form of the invention, use is made of a torsion spring, which by means of a slide arranged on or in the lid handle can be cocked more and more stepwise via the setting part. The torsion spring can have a cranked part, on which a notch or a cam pin of the rotary pivoting segment acts. The torsion spring can be satisfactorily accommodated in the lid handle and can extend over the lid as far as the pressure limiting valve. If necessary instead of this it is also possible to use an elastically resilient lever, a strip spring or a helical spring as a loading spring which can be cocked.

The slide is in accordance with the invention provided with a setting cam or ramp or with helical gear teeth, which on displacement of the slide comes into engagement with the teeth of the pivoting segment and turn the latter on further displacement in such a manner that the rotary torsion spring is cocked more and more. As a result, however, the pivoting segment is firstly moved by the presetting part snapping into its locking position, into a position in which the actuating stop is overriden and, respectively, a corresponding actuation locking means is made ineffective so that the slide can then be advanced as far as an end position for the purpose of increasing the cocking of the torsion spring.

The torsion spring can, in accordance with the invention, be used to exert its reaction force to press the slide, arranged with a suitable play, elastically to one side so that a detent projection of the slide can snap in lateral, stationary detent recesses when the slide is displaced.

In accordance with a further form of the invention the lid handle of the pressure-cooker can be attached on the lid with the help of the hollow housing of the pressure indicating device or, respectively, of an excess pressure valve, in which the pressure indicator is incorporated. The emergence of steam or the throwing out of cooked material through the pressure indicating device can be avoided in accordance with the invention by adopting the feature that the displaceable indicating pin or piston of the pressure indicating device is indirectly acted upon via an elastic protective cap of rubber or the like by the internal pressure of the cooker. Further advantageous features of the invention will be described in detail in the following description referring to the accompanying drawings and are furthermore described in the claims.

In the accompanying drawings the invention is shown in various embodiments by way of example.

Figure 1:
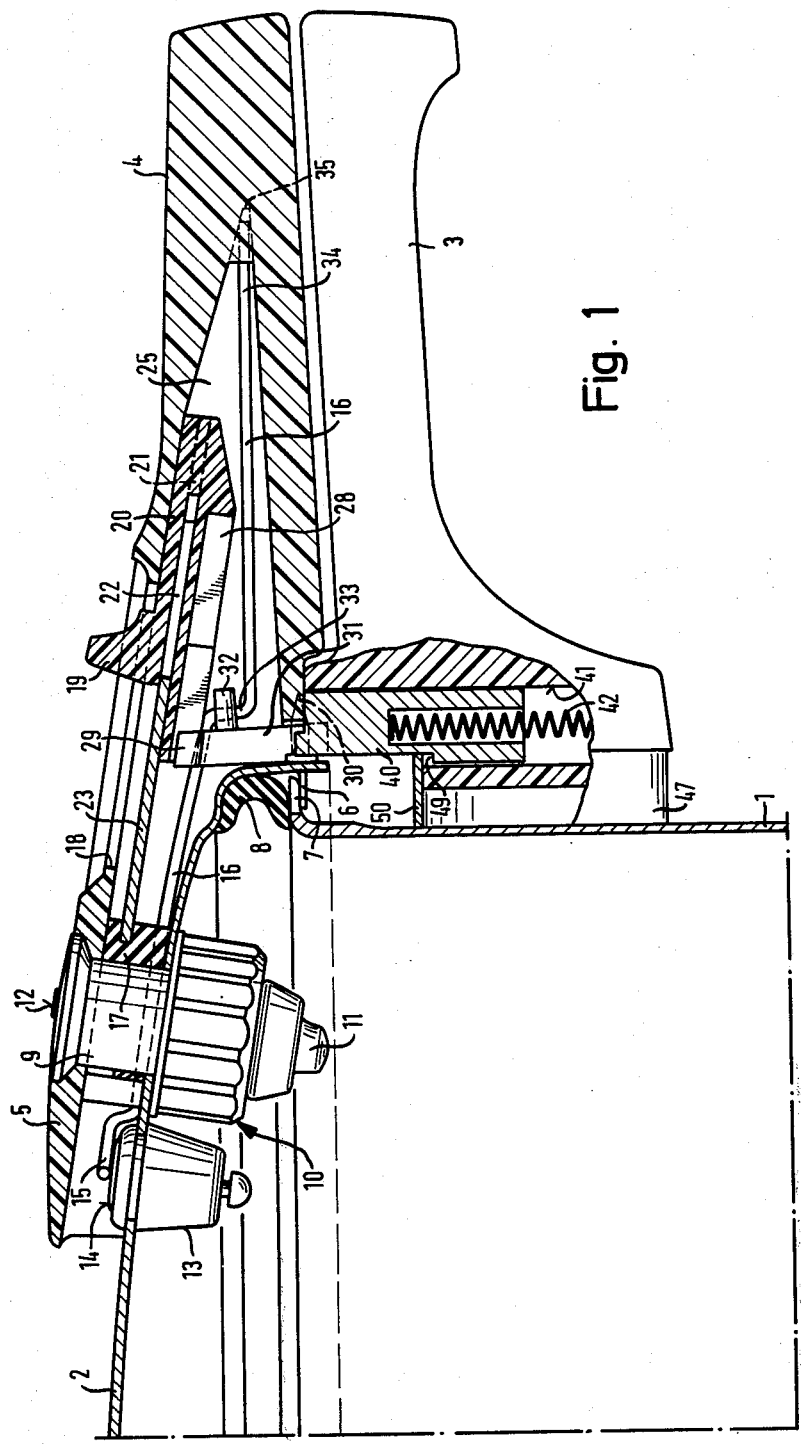
FIG. 1 shows in a vertical longitudinal section and partly in side view a preferred embodiment of the lid and pot handles of a pressure-cooker which is only partly shown.
Figure 2:
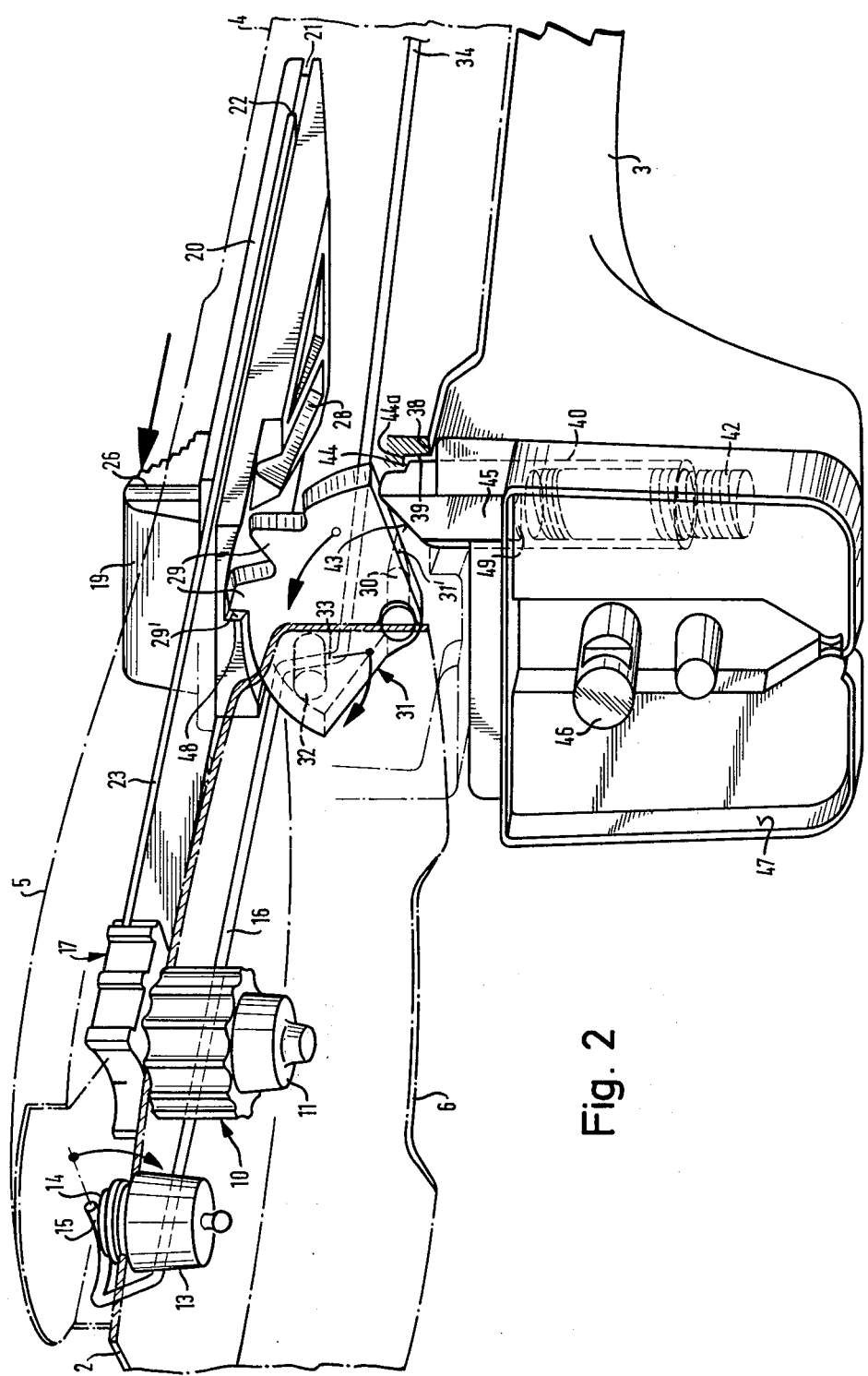
FIG. 2 is a perspective view of the inner parts of the lid and pot handles in accordance with FIG. 1.

A pressure-cooker in accordance with the invention comprises, generally speaking, of a pot 1, a lid 2, a pot handle 3, and a hollow lid handle 4, arranged to cooperate with the pot handle 3. A front part 5 which has a generally U-shaped cross-section and is open downwards, of the lid handle 4 extends in a radial direction over the lid 2, on which it is attached. The lid 2 is provided with segments 6 which are crimped inwards, and which in the case of a turning movement of the lid 2 in relation to the pot 1 about the vertical center axis of the latter fit in the manner of elements of a bayonet closure or fastener into outwardly crimped segments 7 or corresponding shape arranged on the top pot edge or rim. As a result of this a rubber gasket ring or sealing ring 8 placed in the lid rim is pressed on the upper pot rim and as a result the lid 2 and the pot 1 are connected together in a sealing manner.

The front part 5 of the lid handle 4 is connected with the arched lid sheet metal part by the sleeve-shaped valve housing 9 of an excess pressure valve 10, in which there is accommodated also a pressure indicating pin 12 which is acted upon by the internal pressure of the pot via an elastic protective cap 11. Upstream from the excess pressure valve 10 underneath the front part 5 of the lid handle 4 a pressure limiting valve 13 is arranged lying in a hole in the lid 2. On the valve plate 14 of the pressure limiting valve 13 there can act the cranked lever arm 15 of a torsion spring 16 with a variable force. Between the lower surface of the handle part 5 and the surface of the lid 2 there is jammed an intermediate part 17, consisting of an elastic material such as rubber, this part 17 having a hole, through which the valve housing 9 extends. The construction of these valves will later be described below with reference to FIGS. 8 to 12.

In or underneath a rectangular opening 18 in the lid handle 4 there is a rectangular slide plate 20 which is connected with an operating handle 19, the plate 20 being adapted to slide in the longitudinal direction of the lid handle. The slide plate 20 can slide by virtue of lateral guiding grooves 21 with some lateral play on guide rails 22, which form forked extensions of a sliding guiding plate 23. The sliding guiding plate 23 and its guiding rails 22 are mounted in internal, lateral longitudinal grooves 24 of a cavity 25 of the lid handle 4 so that the sliding guiding plate 23 lies just underneath the rectangular hole or opening 18 of the lid handle 4 and covers the latter with respect to a vertically downward direction without hindering the sliding movement of the sliding plate 20. The operating handle 19 has on its side on the right in terms of FIGS. 4 and 7 a projecting detent rail 26, which in the case of a displacement of the sliding plate 20 can snap into position with a spring section into opposite lateral detent recesses 27 of the rectangular opening 18 of the lid handle 4. Adjacent to these parts of the side rim of the opening 18 marks O, I and II are arranged, with which the detent rail 26 provided with a marking index can be set.

In the lower side of the shifting plate 20 helical gear teeth 28 are machined, into which the teeth 29 of a pivoting segment 31, journalled on a pivot pin 30, can so mesh, that the pivoting segment 31 turns when the sliding plate 20 is displaced by means of the operating handle 19 under the rectangular opening 18 of the lid handle 4. The pivot pin 30 is welded on the lateral rim of the lid 2 and serves simultaneously for fixing the lid handle 4 on the lid 2 because it fits into a corresponding hole in the lid handle.

Figure 6:
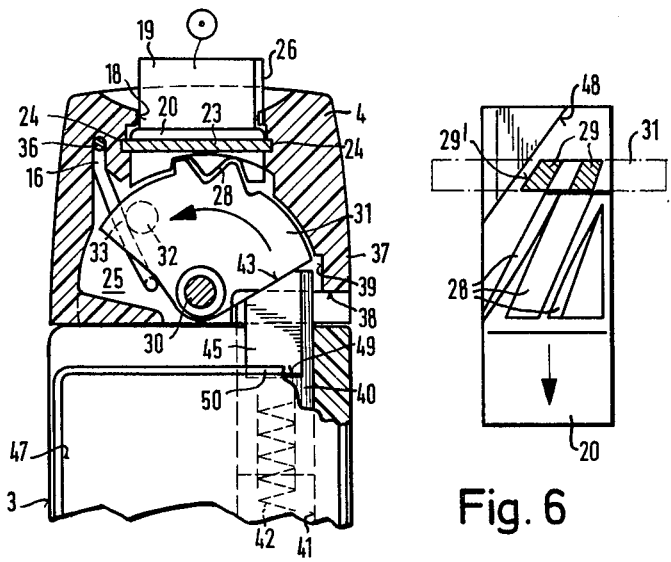
Figure 7:
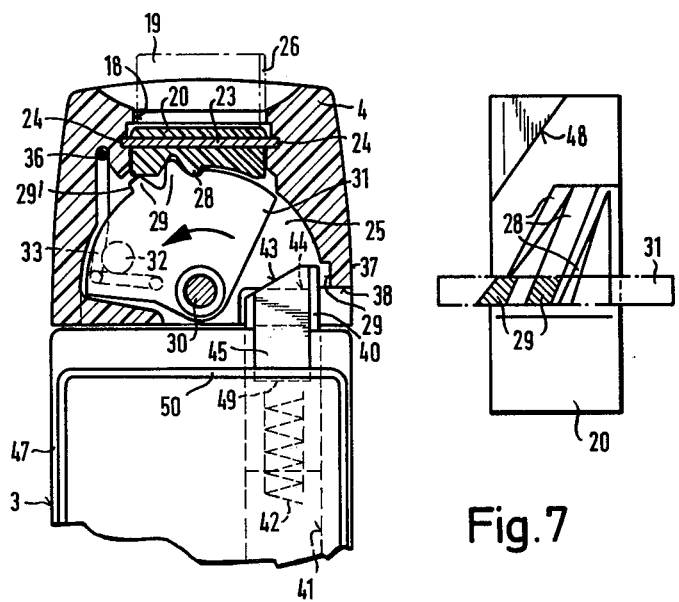
Figure 8:
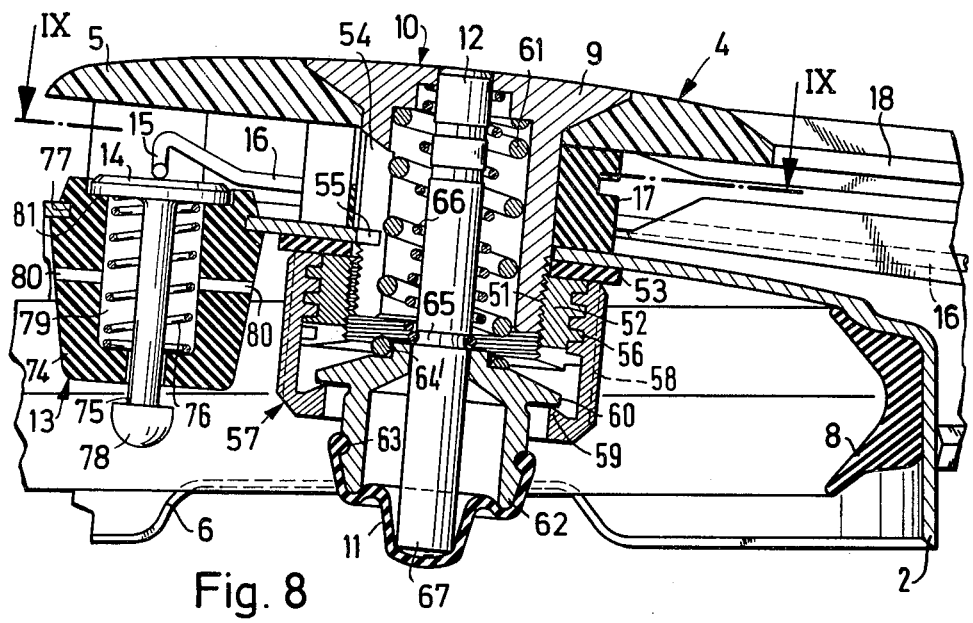
FIG. 8 shows in a vertical longitudinal section which is broken away on both sides, and on a larger scale, a part of a lid and a lid handle with assembled pressure indicating and excess pressure valve in the pressureless condition of the pressure-cooker.
Figure 9:
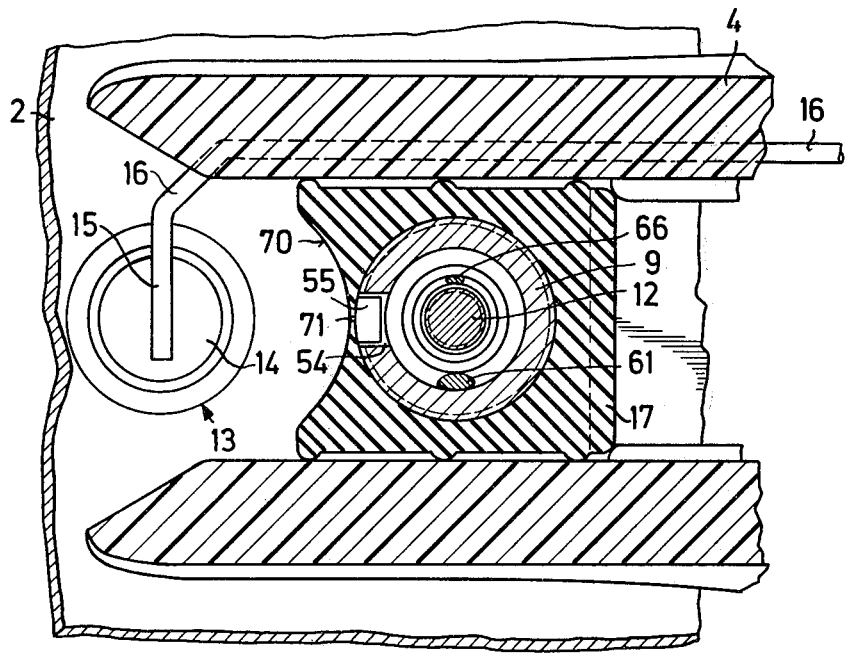
FIG. 9 shows a horizontal section through the lid handle and the valve in accordance with the line IX—IX of FIG. 8.
Figure 10:
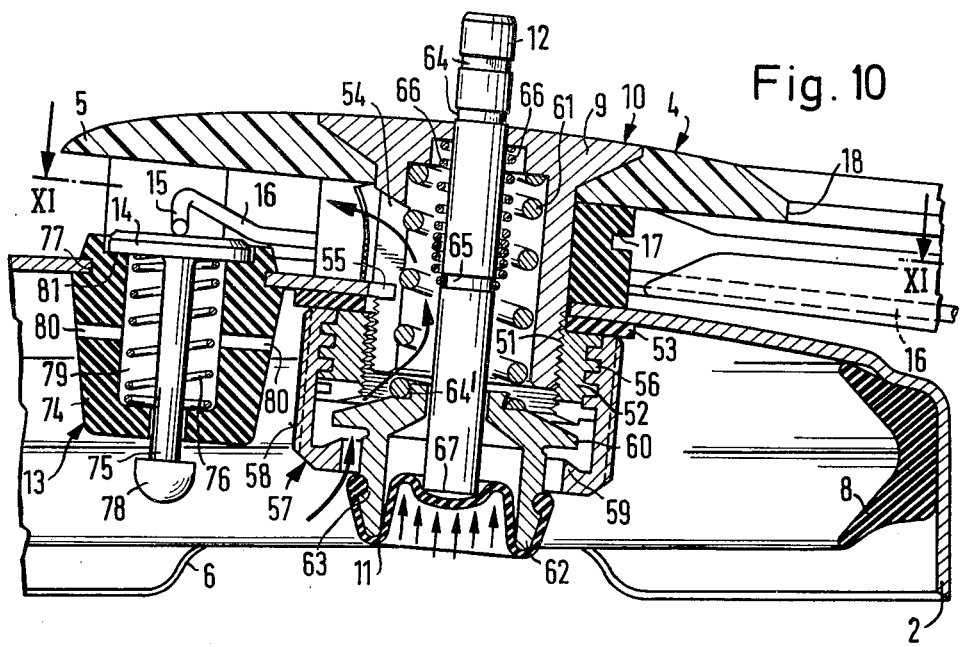
FIG. 10 shows in a vertical longitudinal section the lid and lid handle part in accordance with FIG. 8 with the pressure indicating and excess pressure valve in the excess pressure condition of the pressure-cooker.

The pivoting segment 31 carries on its rear face remote from the side rim of the lid 2 a cam pin 32, which so rests against a cranked crank arm 33 of the torsion spring 16 that the torsion spring is cocked or prestressed more and more when the pivoting segment 31 is turned in an anti-clockwise direction, as is indicated by the arrows shown in FIGS. 6 and 7. The rear end 34 of the torsion spring 16 extends into the cavity 25 of the lid handle 4 towards the rear as far as the end 35 of the cavity, in which it is held. The front torsion spring section, provided with the cranked lever arm 15, of the torsion spring 16 is pivotally mounted in a carrying groove 36 of the lid handle 4.

The wall 37, shown on the right in FIGS. 4 to 7, of the lid handle 4 has a recessed land 38 and behind this there is a step 39 which faces into the cavity 25. This step 38 cooperates with a presetting member, which in accordance with the embodiment of the invention shown consists of a locking pin 40 in the pot handle 3. The lockig pin 40 is adapted to slide axially in a hole 41 in the pot handle 3 and is acted upon by a compression spring 42, which tends to press it out of the hole 41 in an upward direction. The upper free end of the locking pin 40 has a driving ramp 43 and a small rear land 44 and, to the front, a flattened part 45.

The pot handle 3 can be attached on the pot 1 by means of a slotted pin 46 which can be tightened up by means of a screw from the outside. The pin 46 fits into a keyhole slot of a sheet metal holder which is not shown in detail in the drawing, welded onto the wall of the pot. A rectangular metal frame 47 surrounds this holding means.

On the lower side of the shifting plate 20 there is in front of the oblique gear teeth 28 also an oblique guide 48, on which an external flank 29' of the left-hand tooth 29 of the pivoting segment 31 can slide. The edge 49 of the front flattened part 45 of the locking pin 40 can abut against the upper frame rail 50 of the metal frame 47. The pivoting segment 31 has finally a rim edge 31', which can cooperate with the driving ramp 43 of the locking pin 40.

Figure 4:
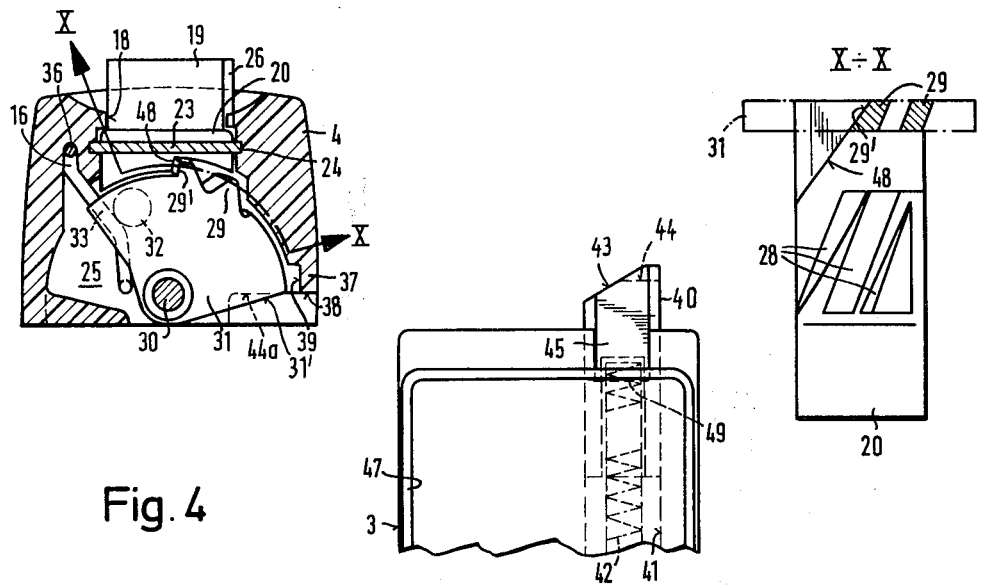
FIGS. 4 to 7 show respectively a vertical section and, respectively, a side view of the lid and pot handles in different operational states, with, to the side of them, diagrammatic drawings of the respective associated relative positions of the slide plate with respect to the pivoting segment.
Figure 5:
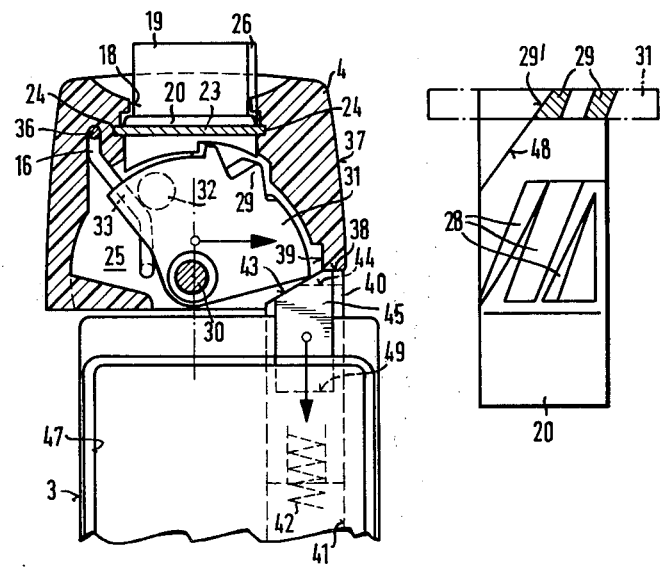

The manner of operation of the device described above and shown in FIGS. 1 to 7 is as follows:

When the lid 2 is placed on the pot 1, the lid handle 4 is still spaced angularly from and above the pot handle 3, as is indicated in FIG. 4. In this condition the torsion spring 16 is relaxed, the pressure limiting valve 13 is open and the slide 19, 20 is in its retracted starting position towards the free end of the lid handle 4. For closing the presure-cooker the lid 2 is turned with the help of the handles 4, 3 in such a manner on the pot 1 that the pot segments 6 fit underneath the lid segments 7. The handles 4, 3 now firstly come into the position, shown in FIG. 5, in superposed relationship, the locking pin 40 being pressed by the land 38 of the lid holding wall 37 against the action of the compression spring 42 into the hole 41 of the pot handle 3. In the positions as shown in FIGS. 4 and 5 the slide 19, 20 can however not be displaced to the front, that is to say towards the lid 2, to such an extent that the teeth 29 of the pivoting segment 31 come into engagement with the oblique gear teeth 28 of the sliding plate 20. The pivoting segment 31 is therefore not as yet turned and the torsion spring 16 remains in its relaxed condition. The pressure limiting valve 13 is still open so that no pressure can be built up in the interior of the pot.

On further mutual twisting of the handles 3 and 4 in relation to each other the handles come into the terminal position which is indicated in FIG. 6. The locking pin 40 snaps under the action of the compression spring 42 into the step 39 after passing over the land 38. This operation is indicated by a distinct click, which provides an acoustic signal for the operating person or cook that the two handles 3 and 4 are now locked together. On the upward flipping or snapping movement of the locking pin 40 furthermore the operating ramp 43 presses against the rim edge 31' of the pivoting segment 31 and turns the latter somewhat in an anti-clockwise direction as indicated by the arcuate arrow indicated in FIG. 6. Under the thrusting action of the external flank 29' of the segment teeth 29 the sliding plate 20 slides to the front into the position shown in FIG. 6 in front of the oblique teeth 28·so that the latter can now come into engagement with the teeth 29 of the pivoting segment 31. The pressure limiting valve 13 is still open, but the sliding plate 20 can now be moved into position with the help of the operating handle 19.

Figure 3:
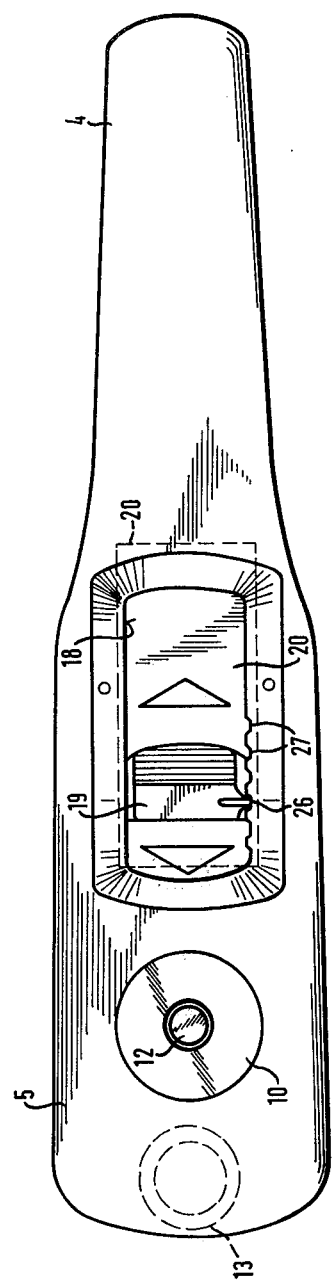
FIG. 3 shows a plan view of the lid handle in accordance with FIGS. 1 and 2.

In the case of such a displacement of the sliding plate 20 the pivoting segment 31 is turned by the gear teeth 28, 29 in an anti-clockwise direction as indicated by the arrow, and the cam pin 32 entrains the crank arm 33 and consequently cocks or stresses the torsion spring 16 more and more. The result is that the front cranked lever arm 15 presses with a consequently increasing force on the valve plate 14 of the pressure limiting valve 13 and closes the latter so that internal pressure can be built up in the pot. Since the stressing of the torsion spring 16 accordingly increases the advanced position of the slide 19, 20, the internal pressure, that is to say the desired cooking pressure, can be readily set steplessly or, if desired, with reference to the marks on the edge of the opening 18 of the lid handle 4 (FIG. 3). The maximum advanced position corresponding to the highest internal pressure stage, of the sliding plate 20 and the corresponding end position of the pivoting segment 31 are shown in FIG. 7. It is to be remarked here that the reaction effect of the torsion spring 16 which is subjected to stress, on the cam pin 32 exerts via the pivoting segment 31 and the teeth 29, 28 a lateral pressure action on the shifting plate 20 so that the detent rail 26 of the actuating handle 19 can snap resiliently into the detent recesses 27 of the opening 18.

In order to be able to open the pressure-cooker when the cooking operation has been completed, it is firstly necessary to move the sliding plate 20 with the help of the operating handle 19 out of the position in accordance with FIG. 7 into the position in accordance with FIG. 6. In this respect the torsion spring 16 is relaxed by turning back the pivoting segment 31 and steam can excape through the pressure limiting valve 13, which is now unloaded, to the outside atmosphere. The handles 3 and 4 however still remain locked to each other. In order to undo this locked state and to be able to remove the lid 2 from the pot 1, the slide 19, 20 must be drawn back still further into its external end position. This is carried out against the resistance of the compression spring 42 because on drawing back owing to the pressure of the ramp guide 48 on the external flank 29' of the segment teeth 29 the pivoting segment 31 is turned back still further in a clockwise direction. The rim edge 31' of the pivoting segment 31 is in this respect arranged to act on the oblique ramp 43 of the locking pin 40 and presses the head face of the latter down below the plane of the land 38 of the lid handle wall 37. The lid handle 4 can now be turned back without any hinderance from the pot handle 3 into the position which is shown in FIG. 4, following which the lid 2 can be doffed from the pot 1.

In FIGS. 8 to 12 the excess pressure valve 10 is shown together with the pressure indicator and the pressure limiting valve 13 in detail (on an enlarged scale), in the case of which the arrangement of these parts is shown in the lid 2 and in the lid handle 4.

The part, extending into the interior of the lid 2 of the valve body 9 of the excess pressure valve 10 is provided externally with a normal left-hand thread 51, on which an annular attachment nut 52 is screwed having a corresponding female thread. Between the annular nut 52 and the interior surface of the lid 2 there is a sealing disc 53 of rubber or the like. The valve body 9 has on its side facing the center axis of the lid 2, in accordance with the invention, a longitudinal slot 54, into which a projecting tongue 55 of the lid 2 extends in order to prevent a twisting of the valve body 9.

The attachment nut 52 is externally provided with a trapezoidal right-handed thread 56, on which a shoulder nut 57, provided with a corresponding female thread, can be screwed. The shoulder nut 57, which externally has a knurled surface 58 to improve ease of handling, has on its lower end in accordance with the invention an edge, drawn inwards, with a valve seat 59. A valve cone or plate 60 cooperates with the valve seat 59 and this valve plate can be axially displaced against the action of a valve spring 61. On a downwardly projecting neck 62 of the valve plate 60 there is in accordance with the invention the beaded edge, in an annular groove 63, of the protective cap 11 of elastic material such as rubber which is held in position and which in the case of internal pressure action can be turned inside out like a rolling sealing arrangement, in an inward direction. The lower end of the valve spring 61 is connected in a fixed manner with the valve plate 60 at 64', while its upper end rests against an internal projection of the valve body 9 in a loose manner.

In the center axis of the valve body 9 the pressure indicating pin 12 is journalled for axial shifting. On the upper part of the pressure indicating pin 12 and with a mutual axial spacing, two marking rings or grooves 64 are provided. Furthermore, in an annular groove 65 of the pressure indicating pin 17 in accordance with the invention the lower end of a progressive spring 66 is attached, whose upper end rests loosely against an internal projection of the valve body 9. Against the lower end 67 of the pressure indicating pin 12 there rests the middle inner wall of the protective cap 11.

Figure 11:
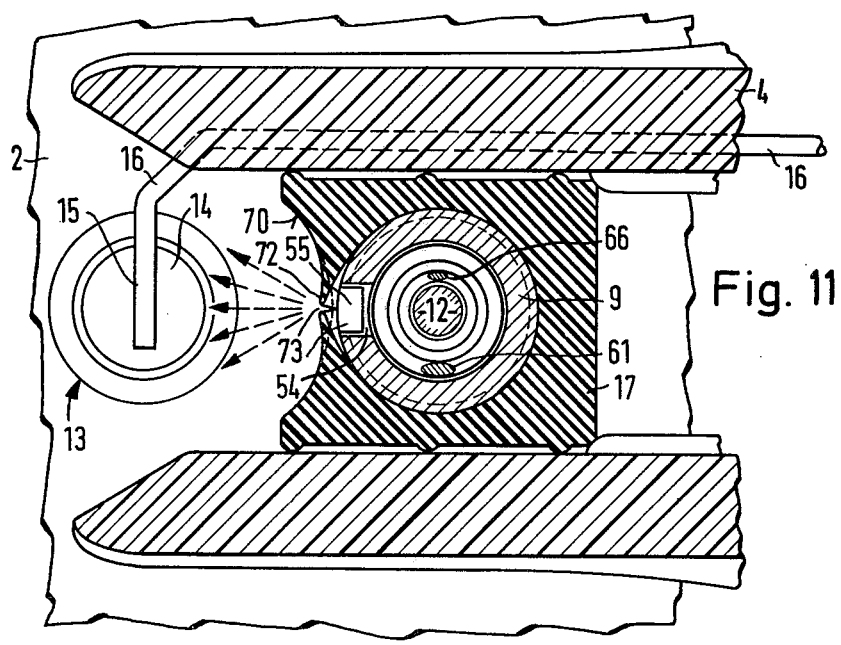
FIG. 11 shows a horizontal section through the lid handle and the valve in accordance with the line XI—XI of FIG. 10.
Figure 12:
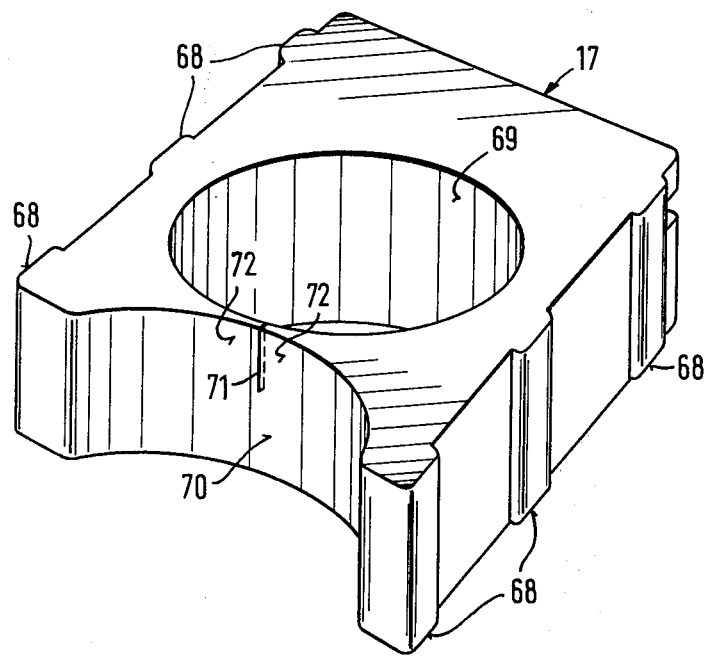
FIG. 12 shows in a perspective enlarged view the sealing piece of the pressure indicating and excess pressure valve.
Figure 13:
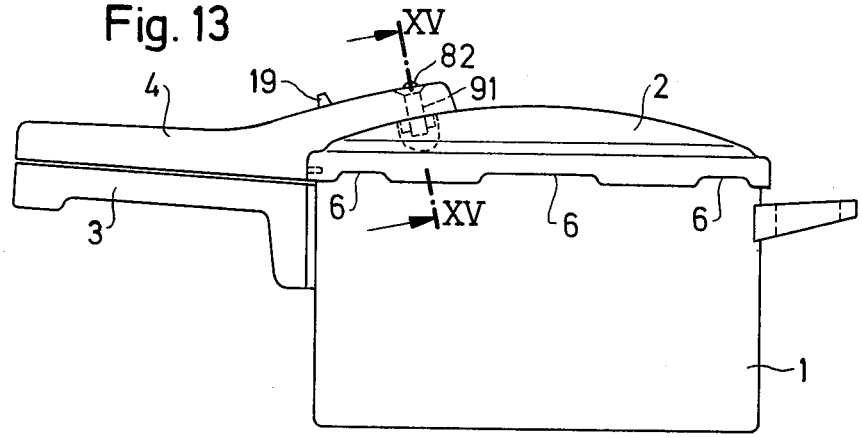
FIG. 13 shows in side view a pressure-cooker with the lid placed in position.
Figure 14:
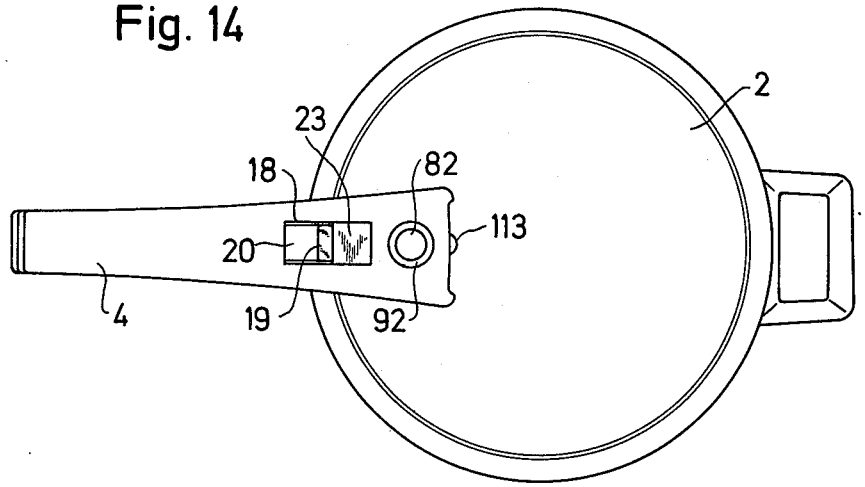
FIG. 14 shows a plan view of the pressure-cooker in accordance with FIG. 13.

The rectangular sealing piece 17 indicated in detail in FIG. 12 has on both longitudingal sides gripping ribs 68 and in the middle it has a round opening 69 for the valve body 9. On its end face 70 facing the longitudinal slot 54 of the valve body 9 the wall of the sealing piece 17 is, in accordance with the invention, drawn into a very thin wall thickness, that is to say reduced to such a thickness, and at its thinnest part is provided with a notch 71. As a result two lips 72 are formed on both sides of the notch 71 and these lips spread out elastically when an internally acting excess pressure occurs, and produce a passage gap 73. (FIG. 11)

Below the projecting wall part 5 of the lid handle 4 in the wall of the lid 2 the pressure limiting valve 13 is arranged, which in accordance with the invention comprises chiefly a hollow valve body 74 of elastic material as for example rubber, a valve pin 75 with a valve plate 14 and a valve spring 76. The valve body 74 is buttoned by means of an annular groove 77 in a hole in the lid wall of the lid 2. The end, opposite to the valve plate 14, of the valve pin 75 carries an abutment head 78. Transverse holes 80, for example two transverse holes, lead into the cavity 79 of the valve body 74 and these holes connect the cavity 79 with the interior of the lid 2 and, respectively, of the pot 1. The valve plate 14 can in accordance with the invention be pressed against the action of the valve spring 76 by the cranked end 15 of the torsion spring 16 with an adjustable pressure on the valve seat 81 of the valve body 74.

The embodiment of the invention shown in FIGS. 13 to 22 differs from the embodiment in accordance with FIGS. 1 to 12 mainly in that the moving setting part, preferably the pivoting segment which can be rotated by means of the slide, is simultaneously constructed as a spring cocking part and as a locking part. Furhtermore, the pressure limiting valve is constructed in a simpler manner and the lid handle is only attached with the help of the pressure indicating device on the lid.

Figure 15:
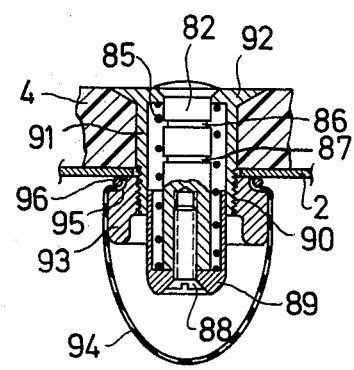
FIG. 15 shows a vertical section on a larger scale and partly broken away in accordance with the line XV—XV of FIG. 13.
Figure 16:
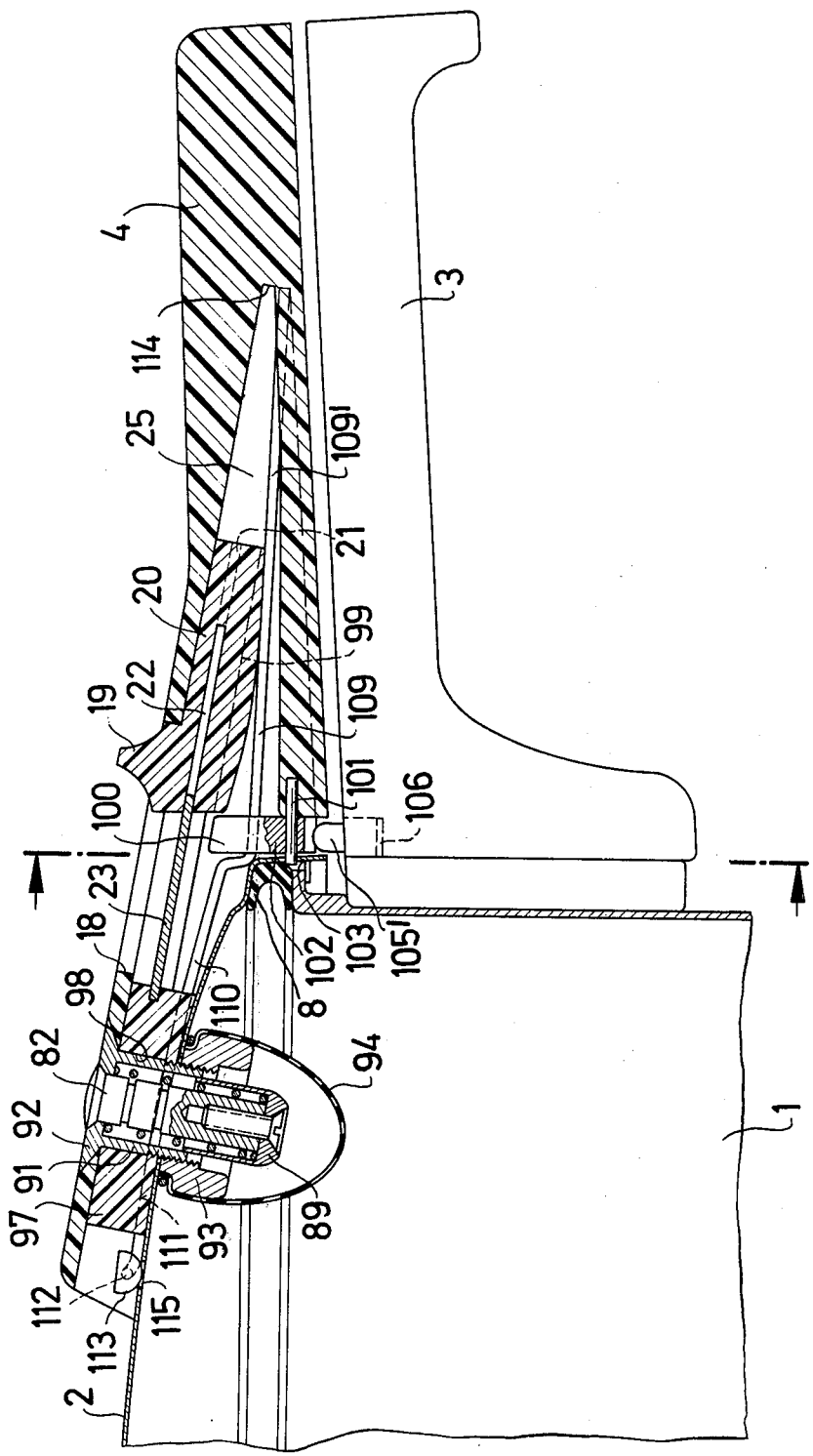
FIG. 16 shows partly in vertical section and partly in side view another embodiment of the lid and pot handles of a pressure-cooker.
Figure 17:
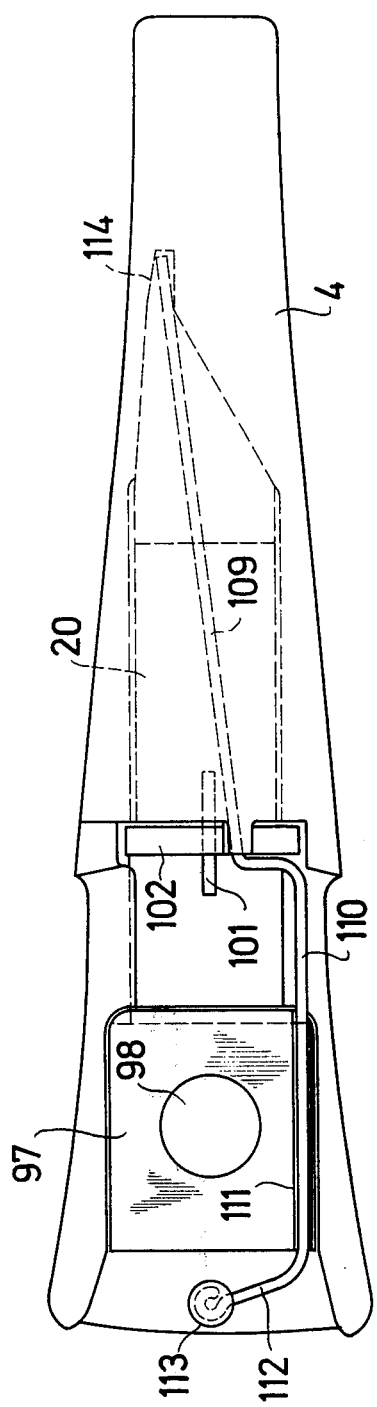
FIG. 17 shows a view from below of the lid handle of the pressure-cooker in accordance with FIG. 16.
Figure 18:
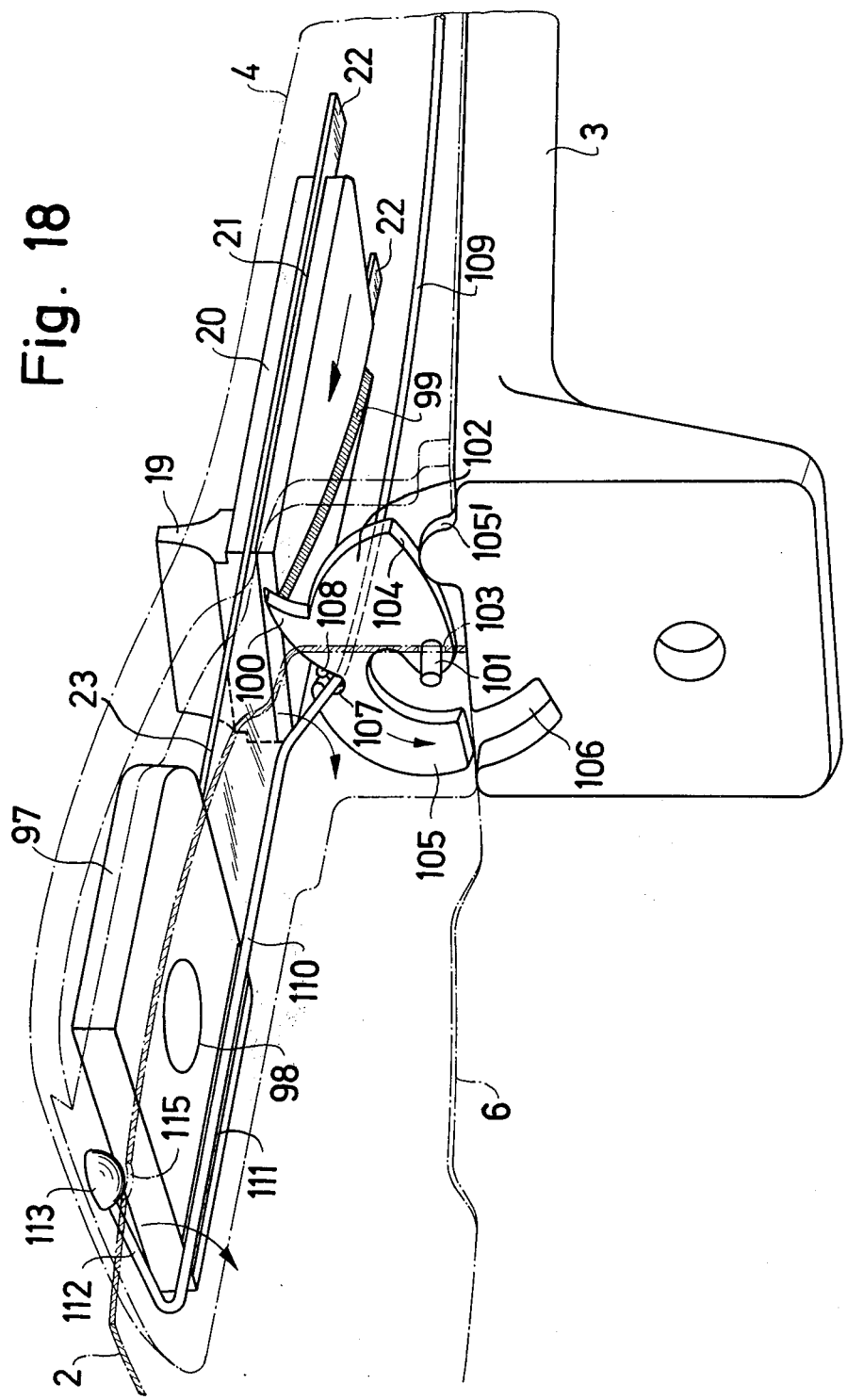
FIG. 18 shows a perspective partly cut away view of the inner parts of the lid and pot handles.
Figure 19:
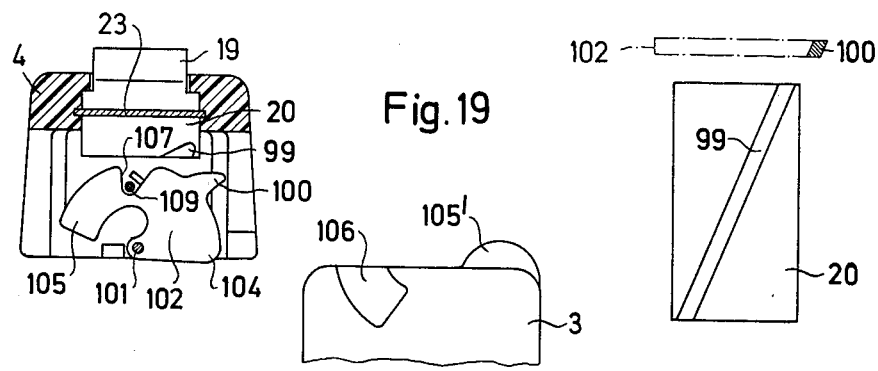
FIGS. 19 to 22 show respectively a cross-section through the lid and pot handles in different operational conditions with representations, shown diagrammatically at the side of the associated positions of the setting parts.
Figure 20:
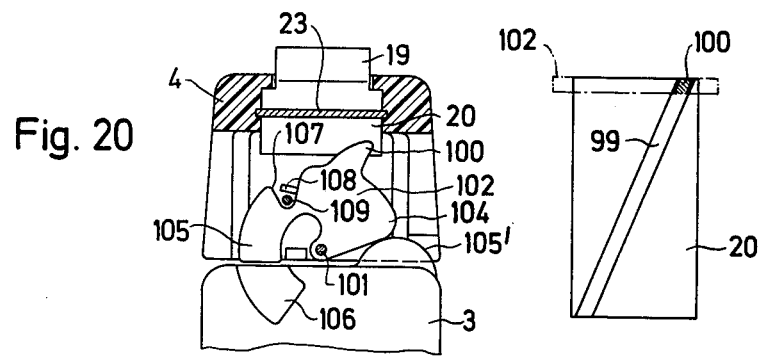

In accordance with FIG. 15 the pressure indicating device consists of an indicating pin 82 with marks 86, 87, and it can be pressed by the pressure, obtaining in the interior of the pressure-cooker, against the action of the spring 85 to a greater or lesser extent in an upward direction above the surface of the lid handle 4. It is possible to see from the marks 86, 87, for example in the form of rings, which become visible one after the other, whether a mean operational pressure or a high or maximum operational pressure obtains in the interior of the pot. The indicating pin 82 is connected by a screw 88 with a hollow piston 89, which is journalled in an axially sliding manner in the cylindrical hole of a screw-threaded bolt 91 which is plugged into a hole in the lid handle 4 and is provided with an external screw thread 90. The bolt 91 has the form of a sleeve. The conical head 92 of the hollow bolt 91 fits into a corresponding depression in the lid handle 4. On the external screw thread 90 which extends through a hole of the lid 2 above the inner side, of the hollow bolt 91 an annular nut 93 can be screwed, which comes to lie against the lower side of the lid and draws the lid handle 4 with the help of the hollow bolt 91 firmly against the upper side of the lid 2 so that at the same time the indicating part in the lid 2 is held and fixed in position.

The pressure obtaining in the interior of the cooker acts upon the hollow piston 13. In order to provide complete sealing from the outside of the indicating part, this pressure action can in accordance with the invention occur indirectly via a rubber cap 94 which can be pressed together elastically under the action of the internal pressure. The foot part of the rubber cap 94 is drawn over the annular nut 93 and is held in a torsion 95 of restricted diameter of the latter by an elastic ring 96 so that the edge of the rubber cap 94 is pressed simultaneously in a sealing manner against the lower side of the lid 2. In the case of a pressure increase in the interior of the pot the rubber cap 94 is pressed inwards so that it comes to lie against the hollow piston 89 and advances the latter compressing the spring 85.

The parts 18 to 23 correspond to the parts 18 to 23 of the embodiment in accordance with FIGS. 1 to 7. In front of the sliding plate 23 in the lid handle 4 a filling piece 97 of rubber or the like is inserted adjacent to the indicating and attachment part 82, 91, 93, for passing through which the filling piece 97 is provided with a hole 98. This filling piece prevents the penetration of foreign matter, residues of food and dirt into the interior of the handle.

In the lower side of the sliding plate 20 there is an operating groove 99 produced by machining which runs obliquely from the front to the back. Into this groove 99 there extends the projecting tooth 100 of a pivoting segment 102 pivoted on a pin 101. This tooth 100 can fit into the groove in such a manner that the pivoting segment 102 turns about the pin 101 when the sliding plate 20 is displaced by the sliding handle 19. The free end of the pin 101 fits into a hole 103 of the lid edge and serves in this manner simultaneously for fixing the lid handle 4 on the pot lid.

The pivoting segment 102 furthermore possesses a cam surface 104 on one side of the pin 101 and on the other side of the pin 101 it has an arcuate bolt or locking means 105. The cam surface 104 cooperates with a projecting cam 105' on the surface of the pot handle 3 while the bolt 105 can fit into an arcuate recess 106 of the pot handle 3.

Furthermore, the pivoting segment 102 between the tooth 100 and the bolt 105 is provided with a notch 107, whose opening is restricted by means of a small pin 108. Into the notch 107 there is inserted the rear crank arm 110 of a torsion spring 109, 110 which is cranked and whose front crank arm 110 is journalled in a bearing groove 111 of the filling piece 97. The front end of the crank arm 110 is provided with a lever arm 112 which is cranked towards the center axis of the handle and the arm 112 has a valve cone 113. The rear end 109' of the rear crank arm 109 extends below the sliding plate 20 into a cavity 25 of the lid handle 4 in a backward direction as far as the end of the cavity 114 in which it is held.

Figure 21:
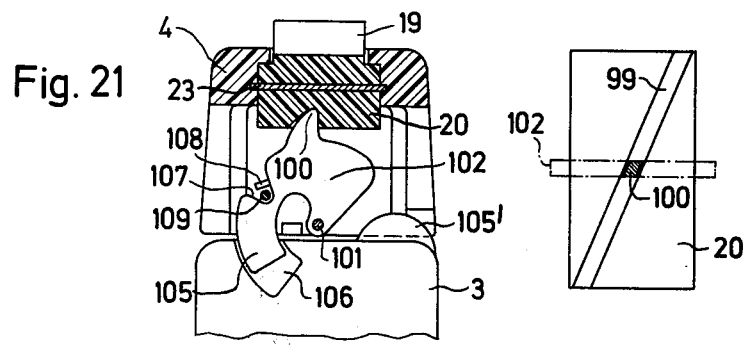
Figure 22:
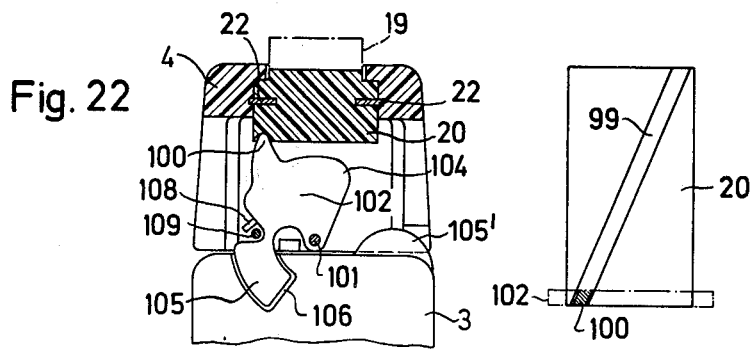

The manner of operation of the device described above and shown in FIGS. 13 to 22 is as follows:

The lid 2 is mounted in the pot 1 and turned on it with the help of the lid handle 4 until the segments of the pot and lid edges fit into each other and the lid handle 4 lies precisely above the pot handle 3. In this respect the cam surface 104 of the pivoting segment 102 runs up onto the projecting cam 105' of the pot handle 3 so that the pivoting segment 102 is swung into an initial position, in which the tooth 100 is opposite to the entry opening of the oblique operating groove 99 of the sliding plate 20 precisely, as can be seen from FIGS. 19 and 20. Firstly the pot is heated until steam is formed and the air or, respectively, the oxygen, is displaced through a steam outlet opening 115 of the lid 2 from the pot. When now the sliding handle 19 is advanced towards the pot or lid respectively, the driving groove 99 cooperating with the tooth 100 produces a twisting of the pivoting segment 102 and as a result the arcuate bolt 105 is introduced into the arcuate recess 106 of the pot handle 3 and the lid handle 4 is locked on the pot handle 3. Simultaneously the crank part fitting into a notch 107 of the pivoting segment 102 is entrained as well so that the torsion spring 109, 110 is turned and is cocked. The valve cone 113 comes to rest with a suitable loading on the steam outlet opening 115 and provides for a steam-tight sealing of the pot. FIG. 21 shows a central advance position of the slide in the case of which the cooker remains sealed up to a mean operational pressure. A further advancing of the slide handle 19 brings about a more pronounced twisting of a torsion spring 109, 110 and a correspondingly higher loading of the valve cone 113 so that the cooker is sealed in a steam-tight manner until the maximum permissible operational pressure is attained. The bolt 105 is in this respect in its lowest position, as is shown in FIG. 22. Opening of the cooker is not possible before the slider handle 19 has been moved back into its starting position and as a result the torsion spring 109, 110 is relaxed and the valve cone 113 is so unloaded that the steam outlet opening 115 is opened. As soon as the pressure in the interior of the cooker has been reduced completely to atmospheric pressure, the slide can be drawn back as far as its end position. The pivoting segment 102 provides for detachment from the lower handle and the lid can be removed from the rest of the cooker.

Figure 23:
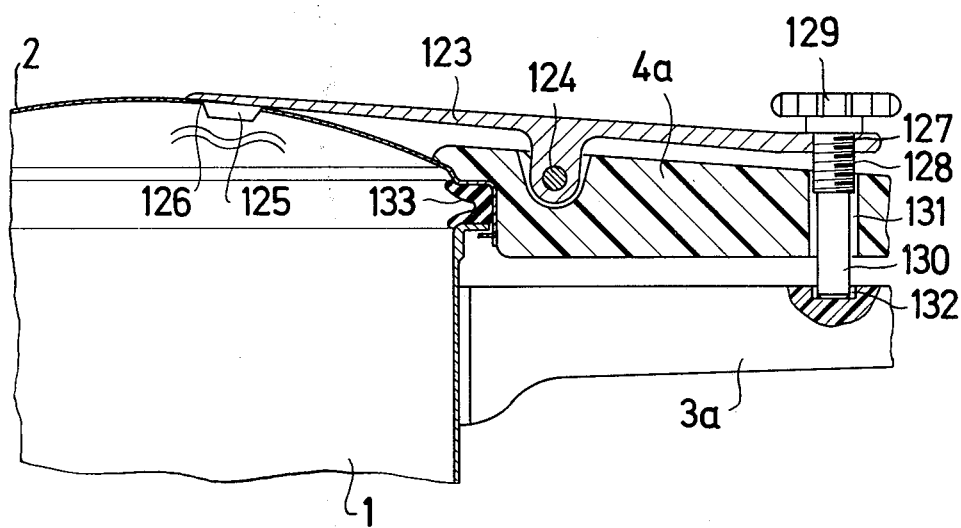
FIG. 23 shows in vertical section a further embodiment of the pressure-cooker in accordance with the invention.

A particularly simple embodiment of the invention is shown in FIG. 23 and in this case on the pot 1 a pot handle 3a and on the lid 2 a lid handle 4a is attached. On the lid handle 4a there is a double-armed lever 123 of elastic material as for example spring steel which can rotate about a pin 124. On the front end of the lever 123 the valve cone 125 is attached, which cooperates with the lid hole 126. The rear end of the lever 123 is provided with a threaded hole 127, into which a setting screw 128 can be screwed by means of a knurled head 129 and the setting screw 128 merges with a safety screw 130, which extends freely through a hole 131 of the lid handle 4a and can snap into a recess 132 of the pot handle 3a when the handle 3a and the handle 4a are precisely superposed. FIG. 23 also shows the rubber sealing ring 133 placed in the lid rim part.

When the interior of the pot or cooker has been vented through the hole 126 in the lid and the pot reaches the cooking temperature, the setting screw 128 is screwed down by means of the knurled head 129 into the screw 127 until the securing pin 130 fits into the recess 132 of the pot handle 3a. The handles 3a and 4a are accordingly mutually locked.

In order to obtain a higher excess pressure in the pot, the setting screw 128 is turned by means of the knurled head 129 so that the lever 123 is more strongly stressed and the valve cone 125 is pressed with a greater spring force against the hole 126 in the lid and in this case the steam only starts escaping when a higher excess pressure is reached in the interior of the pot. For unloading or relaxing the lever 123 and for simultaneously unlocking the setting screw 128 is turned up as far as it will go in the opposite direction.

Figure 24:
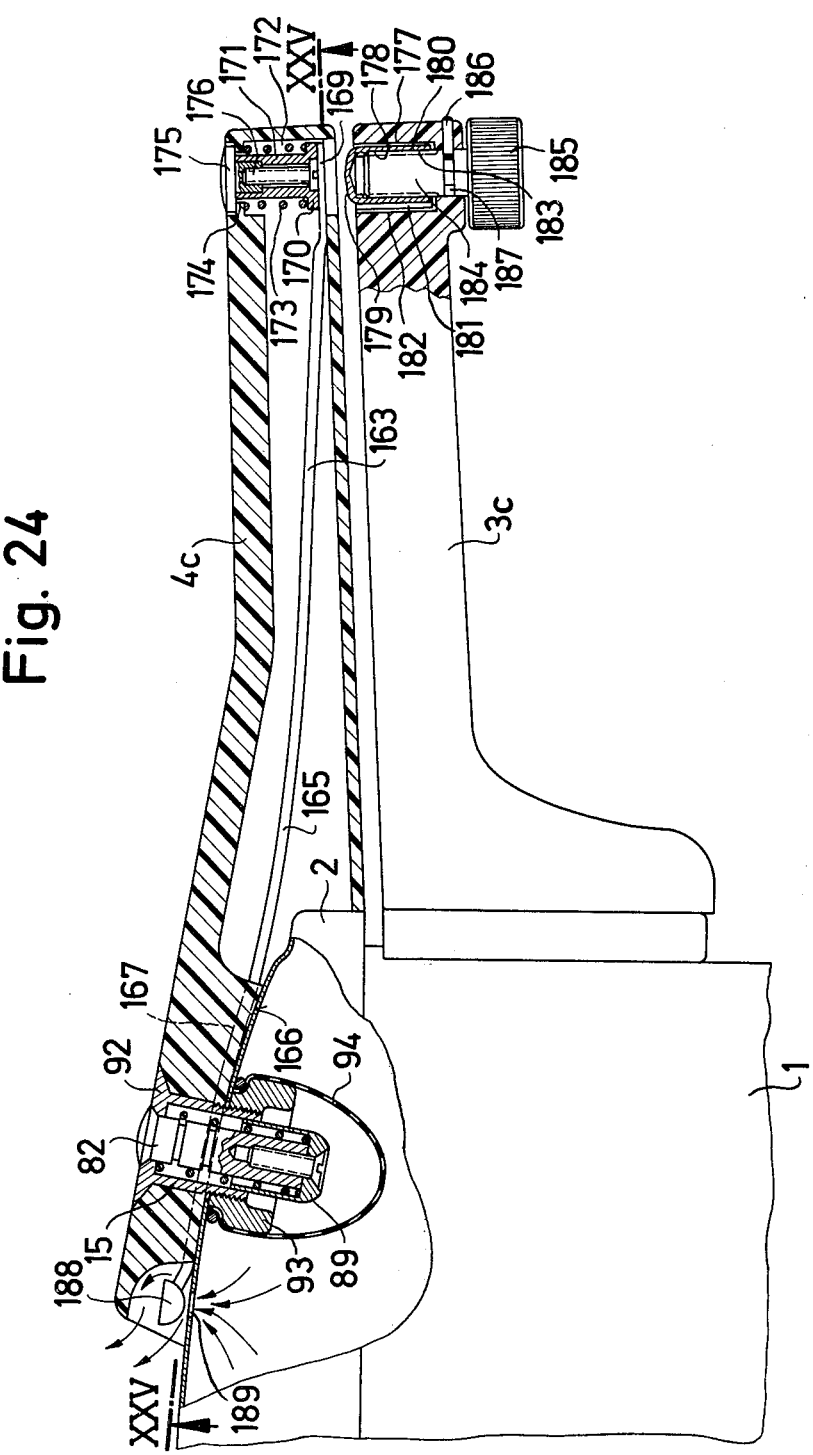
FIG. 24 shows in vertical section a still further embodiment of a pressure-cooker in accordance with the invention.
Figure 25:
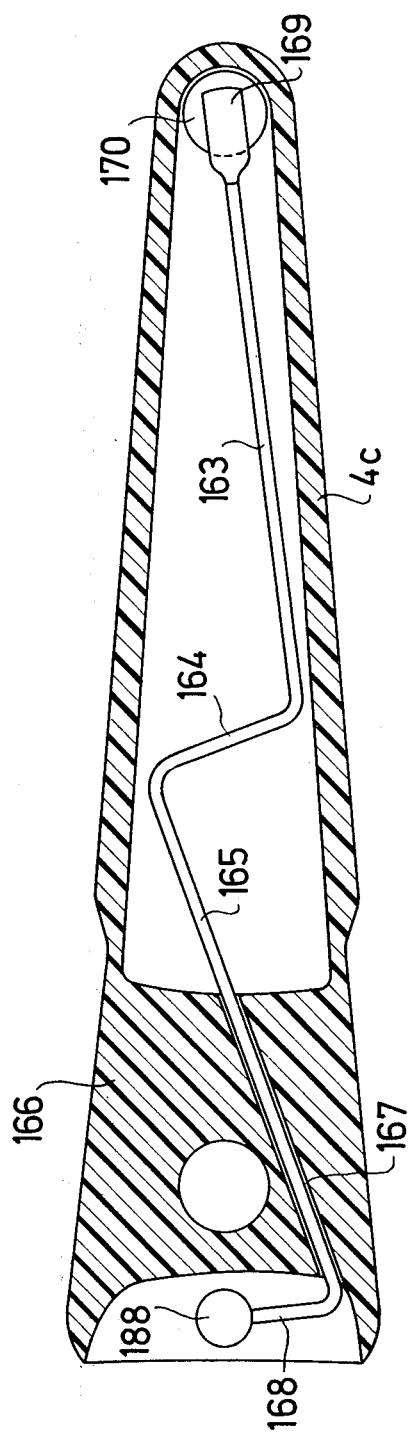
FIG. 25 shows a horizontal section through the lid handle on the line XXV—XXV of FIG. 24, as seen from below.

A further embodiment of the invention is shown in FIGS. 24 and 25 and in this case a hollow lid handle 4c has a combined torsion and bending spring mounted in it, the spring consisting of a rear elastic bending spring part 163, a cranked part 164, and a front torsion spring part 165, which is journalled in a groove 167, provided on the lower side 166 of the handle 4c, and is provided with a cranked lever arm 168, which carries a valve cone 188, which cooperates with an opening 189 in the lid. The rear end of the bending spring part 163 is provided with a flattened part 169, which comes to lie against the abutment plate 170 of a sleeve 171. The sleeve 171 can move in a hole 172 on the rear end of the lid handle 4c against the action of the spring 173, which is held between the abutment plate 170 and a collar 174 of the handle 4c. On the sleeve 171 at the top a sleeve head 175 is attached by means of a pin screw 176. The sleeve head 175 is drawn by the sleeve 171 under the action of the spring 173 onto the collar 174.

The rear end of the pot handle 3c has a hole 177 in it, which is precisely opposite axially to the hole 172 of the lid handle 4c, when the two handles are superposed in the closed position. In the hole 177 there is a plunger sleeve 180 which is provided with a female screw thread 178 and at the top is terminated by an abutment head 179. This sleeve 180 can move axially but cannot turn. A turning of the abutment sleeve 180 is prevented by a longitudinal spring 181 attached to its side wall and this spring 181 can slide in a longitudinal groove 182 of the hole 177. There is screwed into the internal screw thread 178 of the plunger sleeve 180 the external screw thread 183 of a threaded rod 184, which below the pot handle 3c is provided with a fixed connection with a knurled head 185. The screw threaded rod 184 can only turn in the pot handle 3c, while axial movement of it is prevented by a fixing pin 186, which fits into an annular groove 187 of the screw threaded rod 184. By turning the screw threaded rod 184 the torsion and bending spring 163–165 can be stressed and at the same time the plunger sleeve 180 moves into the hole 172 of the lid handle 4c and locks the two handles with respect to each other. The degree to which it is stressed can be seen by the displacement of the indicating sleeve 171 and 175. After termination of the cooking operation the screw threaded rod 184 is turned back, the stress of the torsion bending spring is reduced and the excess steam escapes through the lid opening 189. The locking of the handles 3c, 4c is undone in this case, the lid can be turned back on the pot and then removed from the pot.

The invention is naturally not limited to the embodiments described above and shown in the drawings by way of example and instead it comprises all variations and modifications within the scope of the main features of the invention.

I claim:
1. A pressure cooker having pot and lid parts rotatable relative to each other and connectable with each other by a bayonet type joint, and pot and lid handles respectively connectable with each other, comprising:
   a pressure limiting valve mounted on said lid;
   cockable spring means for manually loading said pressure limiting valve to a desired pressure within a range of pressures within said pressure cooker;
   means for locking said pot and lid handles with each other; and
   means for cocking said spring only with said lid and pot handles locked together.
2. A pressure cooker in accordance with claim 1 further comprising a movable setting member for actuating said means for cocking and said means for locking.
3. A pressure cooker as in claim 1 wherein said means for locking is movable between locked and unlocked positions and said movable member actuates said means for cocking only with said means for locking in said locked position.
4. A pressure cooker as in claim 1 wherein said cocking spring means consists of a torsion spring rotatably mounted in said lid handle and being rotated by said movable member.
5. A pressure cooker as in claim 1 further comprising manually operable sliding means mounted in said lid handle for operating said movable member.
6. A pressure cooker as in claim 5 wherein said cockable spring means is a torsion spring mounted in said lid handle and said movable member is pivotally mounted in said lid handle and engageable with said torsion spring, whereby movement of said sliding means rotates said movable member to stress said torsion spring.
7. A pressure cooker as in claim 6 wherein said movable member includes a cam pin and said torsion spring includes a crank arm engageable therewith whereby increasing rotational movement of said movable setting member causes increasing tension in said torsion spring.
8. A pressure cooker as in claim 7 wherein said movable setting member is pivotally mounted in one of said handles and said means for locking and said means for cocking are part of said movable setting means, said other handle including means for engaging said means for locking.
9. A pressure cooker as in claim 6 wherein said sliding means includes an operating cam and said movable setting member includes cam follower means engageable therewith whereby movement of said sliding means causes rotation of said movable means.
10. A pressure cooker as in claim 8 wherein said movable member is rotatable about a longitudinal axis of said lid handle, said movable member further including a radially projecting tooth, said sliding means including a driving groove extending obliquely along said longitudinal axis and engageable with said projecting tooth, said movable member further including an arcuately shaped bolt, said pot handle including an arcuate recess for receiving said bolt, said movable member further including a notch between said bolt and said projecting tooth, said torsion spring further including a rear crank arm engageable with said notch whereby rotation of said movable element causes said torsion spring to exert increasing pressure on said pressure limiting valve.
11. A pressure cooker as in claim 10 wherein said movable member includes a cam surface oppositely disposed to said arcuately shaped bolt, said pot handle further includes a projection whereby upon superposition of said pot and lid handles said projection and said cam surface are engageable to rotate said movable member into an initial position whereby said projecting tooth is aligned with said driving groove.
12. A pressure cooker as in claim 1 wherein said means for cocking includes a stop member which is overridden by operation of said means for locking.
13. A pressure cooker as in claim 12 wherein said means for locking includes a presetting member mounted thereon for presetting the position of said movable member with operation of said means for locking.
14. A pressure cooker as in claim 13 further comprising an excess pressure valve including a valve body, a sealing piece consisting of an elastic material mounted between the lowest surface of said lid handle and the upper surface of said lid and including a thin wall having a notch with two lips, said valve body extending through an inner opening of said sealing piece whereby a pressure gap is created between said two lips with excess pressure within said pressure cooker.
15. A pressure cooker as in claim 13 wherein said lid handle further includes a cavity underneath said sliding means, said movable setting member is pivotally mounted within said cavity, said presetting member being slidably mounted within said pot handle such that with said pot and lid handles locked together said movable member is moved by said presetting member, said sliding means further including first teeth, said movable member further including second teeth, whereby said first and second teeth are engaged to permit further movement of said sliding means.

16. A pressure cooker as in claim 15 wherein said pot handle further includes a hole, said presetting member consists of a locking pin mounted within said hole and biased therein by a compression spring, the top free end of said locking pin having an operating ramp, the side wall of said lid handle including a shoulder and a step portion whereby rotation of said lid and pot handles into superposed positions with respect to one another causes said locking pin to snap into said step thereby locking said lid and pot handles and said operating ramp moves said movable member into said preset position.

17. A pressure cooker as in claim 16 wherein said lid handle further includes detent recesses positioned along said opening and said sliding means further includes a detent whereby displacement of said sliding means causes said detent to successively engage said detent recesses.

18. A pressure cooker as in claim 17 wherein with movement of said sliding means the reaction spring force of said torsion spring is exerted on said sliding means through said movable member and said first teeth whereby said detent is caused to engage said detent mechanism.

19. A pressure cooker as in claim 18 wherein said sliding means further includes a guide mounted obliquely to said longitudinal axis in front of said first teeth and said movable member further includes guide receiving means for slidingly contacting said guide.

20. A pressure cooker as in claim 2 wherein said movable setting member consists of a setting screw mounted in one of said handles and engageable with the other of said handles, whereby the closing of said setting screw simultaneously locks said lid handle and said pot handle together and cocks said spring.

21. A pressure cooker as in claim 2 wherein said cockable spring means consists of a partially elastic flexible arm of a double-armed lever which contacts said pressure limiting valve, the other arm of said double-armed lever being engaged by said setting screw.

22. A pressure cooker as in claim 21 wherein said double-armed lever is mounted to an aperture in said lid handle by a shaft passing through said aperture and an oppositely disposed recess in said pot handle with said lid and pot handles locked.

23. A pressure cooker as in claim 20 wherein said lid handle and pot handle each include apertures which are in aligned relationship with said pot and lid handles locked together, said setting screw passing through said aligned apertures for locking said lid and pot handles, said cockable spring means includes a rod-shaped spring extending from said pressure limiting valve to said setting screw, whereby tightening of said setting screw cocks said rod-shaped spring.

24. A pressure cooker as in claim 23 wherein said pot handle further includes a plunger sleeve mounted in the aperture therein and having an internal screw thread for axial displacement of said plunger sleeve, said setting screw including an external screw thread engageable with said internal screw thread, said setting screw including a rotary knob, said lid handle further including an indicating sleeve for receiving said setting screw and being displaceable in accordance with the closing of said setting screw, said cockable spring means engaging said indicating sleeve and being tensioned in accordance with the displacement thereof.

25. A pressure cooker as in claim 12 wherein said presetting member also constitutes said means for locking.

26. A pressure cooker as in claim 1 further comprising an excess pressure valve including a sliding pressure indicating pin, and a valve body for mounting said excess pressure valve and for attaching said lid handle to the lid cover of the pressure cooker.

27. A pressure cooker as in claim 26 wherein said excess pressure valve further includes a valve plate having a downwardly projecting neck including an annular groove, and further including an elastic protective cap having a beaded edge for mounting within said annular groove, said protective cap covering the end of said pressure indicating pin mounted within the pressure cooker.

* * * * *